US006978196B2

(12) United States Patent
Albertus

(10) Patent No.: US 6,978,196 B2
(45) Date of Patent: Dec. 20, 2005

(54) METHOD FOR MATCHING A MOTOR VEHICLE WHEEL VALVE IDENTIFIER WITH AN IDENTIFIER OR SAID WHEEL

(75) Inventor: Sebastien Albertus, Montigny-le-Bretonneux (FR)

(73) Assignee: Renault, Boulogne Billancourt (FR)

( * ) Notice: Subject to any disclaimer, the term of this patent is extended or adjusted under 35 U.S.C. 154(b) by 279 days.

(21) Appl. No.: 10/466,625

(22) PCT Filed: Jan. 18, 2002

(86) PCT No.: PCT/FR02/00206

§ 371 (c)(1),
(2), (4) Date: Jul. 18, 2003

(87) PCT Pub. No.: WO02/057098

PCT Pub. Date: Jul. 25, 2002

(65) Prior Publication Data

US 2004/0055685 A1   Mar. 25, 2004

(30) Foreign Application Priority Data

Jan. 18, 2001 (FR) .................................. 01 00672

(51) Int. Cl.$^7$ ............................................. G06F 17/00
(52) U.S. Cl. ............................ 701/29; 701/2; 701/35; 340/447
(58) Field of Search ............................ 701/29, 32, 33, 701/34, 35, 2; 340/442, 443, 445, 447; 702/182, 702/183, 184; 73/146.2, 146.4, 146.8

(56) References Cited

U.S. PATENT DOCUMENTS

| 5,602,524 | A  |   | 2/1997 | Mock et al. ................. 340/447 |
| 5,612,671 | A  | * | 3/1997 | Mendez et al. .............. 340/447 |
| 5,880,363 | A  | * | 3/1999 | Meyer et al. ............... 73/146.5 |
| 6,259,361 | B1 | * | 7/2001 | Robillard et al. ........... 340/447 |
| 6,278,363 | B1 | * | 8/2001 | Bezek et al. ................. 340/442 |
| 6,362,731 | B1 | * | 3/2002 | Lill ............................ 340/445 |
| 6,518,876 | B1 | * | 2/2003 | Marguet et al. ............. 340/447 |
| 2002/0092347 | A1 | * | 7/2002 | Niekerk et al. ............. 73/146.2 |

FOREIGN PATENT DOCUMENTS

EP   1 026 015   8/2000

* cited by examiner

Primary Examiner—Tan Q. Nguyen
(74) Attorney, Agent, or Firm—Oblon, Spivak, McClelland, Maier & Neustadt, P.C.

(57) ABSTRACT

A method for matching an emitting valve identifier with that of a wheel in the memory element of an on-board vehicle computer, including steps of specific excitation of the valve and reception of a specific frame sent in response; decoding and analysis of the frame and recognition of the valve identifier; presentation of the identifier to an operator; matching of wheel and valve identifiers and inputting of the identifiers into the memory element. In the method the presentation is performed using a diagnostic tool, the diagnostic tool receiving at least the valve identifier and status data by the on-board receiver.

10 Claims, 2 Drawing Sheets

METHOD FOR MATCHING A MOTOR VEHICLE WHEEL VALVE IDENTIFIER WITH AN IDENTIFIER OR SAID WHEEL

BACKGROUND OF THE INVENTION

1. Field of the Invention

This invention relates to a method of matching a wheel valve identifier with an identifier of that wheel registered in the memory of an onboard computer of a motor vehicle.

2. Discussion of the Background

According to one method of matching, a valve of the type capable of emitting a field of radio signals, or radio field, is used, containing at least the valve identifier and a state specifying the emitting conditions of the valve. In response to a specific excitation, a specific radio field containing at least one valve identifier and one specific state is emitted by that type of valve. Different information like the tire pressure of the wheel bearing the valve can be included in that field.

The onboard computer possesses in memory the identifiers of the wheels capable of bearing valves of the aforesaid type.

An onboard receiver, combined with the onboard computer, receives the fields emitted by the valves of the vehicles, and even by valves of other vehicles. It transmits them to the onboard computer, which decodes them.

In order to supply data usable by a driver of the vehicle, the onboard computer must allocate the information contained in those fields to the wheels bearing the valves which have emitted them. It must therefore have in memory a table specifying the match between the identifier of each valve and the identifier of the wheel bearing it.

After a wheel change or the first mounting of the wheels, an operator must update that matching table. That update proceeds according to the following stages:

specific excitation of a valve whose operator wishes to match the identifier with the identifier of the wheel bearing it, in order to produce the emission by that valve of a field which is distinguished by a specific state, reception of the specific field emitted in response to the excitation, decoding of the specific field, analysis of at least the "valve identifier" and "state" data contained in the specific field and recognition of the identifier of that valve, presentation to an operator of at least the "valve identifier" data contained in that specific field, a means of distinction rendering said data distinguishable, matching of the wheel identifier with the valve identifier by the operator, input in said memory of the valve identifier matching the wheel identifier.

The prior art also teaches a method in which an operator uses a multifunction tool serving at the same time as specific excitation emitter, receiver of fields emitted by valves, field decoding tool and display tool.

A diagnostic tool, generally available to operate different controls on a vehicle, can serve as interface between the operator and the onboard computer.

More specifically, by means of that multifunction tool, the operator emits a specific excitation, at 125 KHz, for example, to a valve whose identifier is unknown to him. The multifunction tool receives in response a field containing a specific state and emitted on a given frequency, 433 MHz, for example, by the valve excited. It decodes same, retrieves and displays at least the identifier of the emitting valve matching its specific state. That specific state signifies that the field comes from a valve excited by means of the multifunction tool and thus distinguishes it from other fields received by the multifunction tool.

A complex multifunction tool is expensive.

Furthermore, it is usable only with valves emitting on a single frequency, 433 Mhz, for example. Now, not all valves of the type mentioned emit on the same frequency, notably in order to take into account authorizations peculiar to certain countries.

Multifunction tools similar to the one described above, but capable of receiving other frequencies, must therefore be used in order to be able to change wheels equipped with valves of the type mentioned emitting on different frequencies. In the present state of the art, garages have to be equipped with as many different tools as there are emitting frequencies used by those valves.

SUMMARY OF THE INVENTION

The main object of this invention is to provide in an onboard computer a method of matching a wheel valve identifier with the identifier of that wheel, which is inexpensive and compatible with valves of the type mentioned emitting on various frequencies.

That object is accomplished by a presentation to the operator of at least the "valve identifier" data contained in the said specific field, a means of distinction rendering that data distinguishable through a diagnostic tool, that diagnostic tool receiving at least the "valve identifier" and "state" data via the onboard receiver.

Thus, the method according to the invention uses a diagnostic tool that is generally available and can be reprogrammed for that purpose inexpensively.

No receiver other than that of the onboard computer already available is necessary.

The method according to the invention is therefore less costly than that of the prior art.

The method according to the invention also makes it possible to overcome the incompatibility of the multifunction tool of the prior art with certain valve emitting frequencies, the valves borne by the wheels of a vehicle being chosen to emit on a frequency that can be interpreted by the onboard receiver of that vehicle.

According to other optional characteristics of the invention:

the "valve identifier" and "state" data received by the said diagnostic tool are previously decoded by said onboard computer;

the said specific excitation is produced by means of an emitting tool, such an emitting tool being simple and inexpensive;

the said specific excitation is produced by means of a deflation of a tire of the wheel bearing said valve, which, on the one hand, reduces costs to the utmost and, on the other, makes possible a matching of a valve identifier and a wheel identifier, even in case of failure of an emitting tool capable of specifically exciting a valve;

the said diagnostic tool performs said analysis of at least the "valve identifier" and "state" data contained in said specific field and said recognition of the identifier of said valve;

the said operator carries out said matching by means of said diagnostic tool;

the said valve identifier is entered in memory, matching said wheel identifier, by means of said diagnostic tool;

the diagnostic tool transmits to the onboard computer a valve identifier that it has received from the latter; that is, the operator, after having established the match between a valve identifier and a wheel identifier, as presented to him by the diagnostic tool, does not need to enter that valve identifier, which limits the risk of error;

an operator matches a valve identifier, a wheel identifier and a set of wheels identifier by means of the diagnostic tool.

This invention also relates to a system for use of the method according to the invention.

BRIEF DESCRIPTION OF THE DRAWINGS

Other characteristics and advantages of this invention will appear on reading the description which follows and on examining the attached drawing, in which.

DETAILED DESCRIPTION OF THE DRAWINGS

Figure 1:
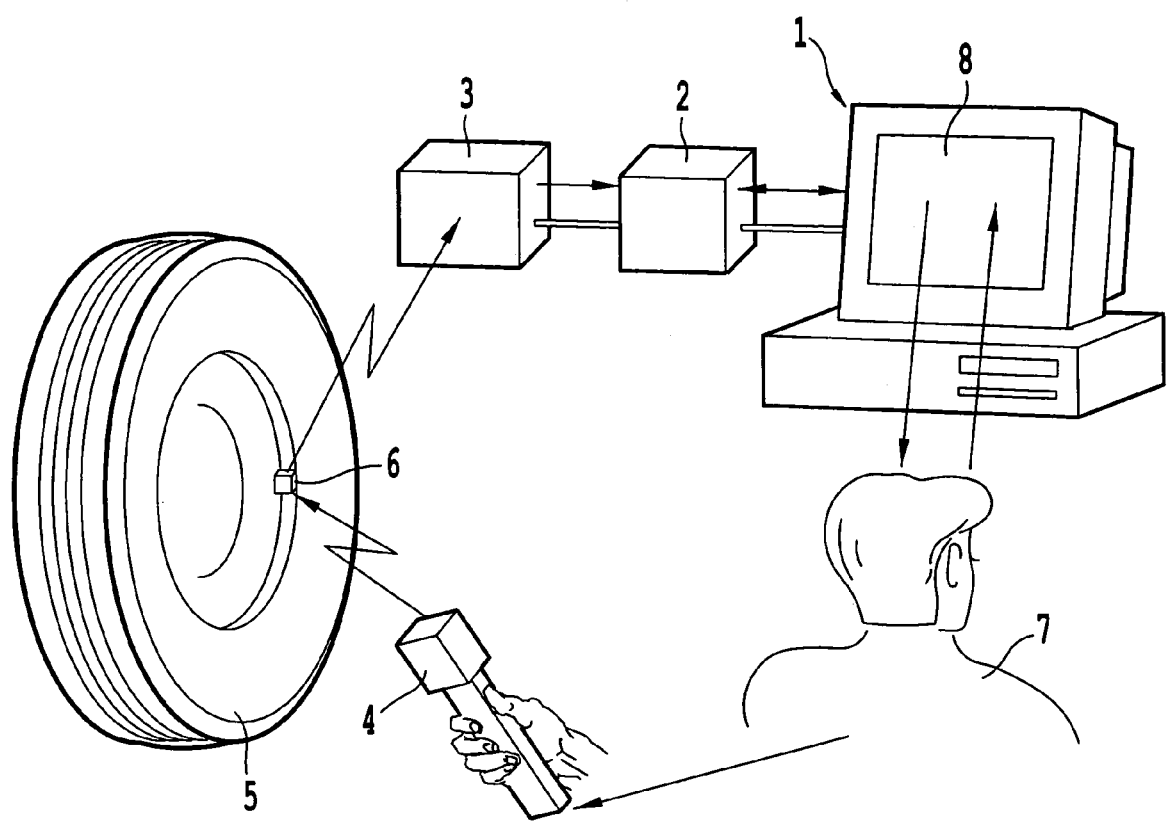
FIG. 1 schematically represents an embodiment of a system for use of the method according to the invention.

Referring to FIG. 1 of the attached drawing, it appears that the system represented comprises a diagnostic tool 1, in the form, for example, of a microcomputer.

Such a diagnostic tool 1 is generally available to operate different controls on a vehicle, to analyze the results thereof and to supply an operator with different possibilities on vehicle breakdowns or malfunctions. It is used, for example, to detect injection failures of air bags, to configure an onboard computer 2, teach it start-prevention codes, etc. To adapt to different vehicles or different standards, it is provided with a plurality of diagnostic functions and is easily reprogrammable.

If it is preferable to reprogram an existing diagnostic tool 1, a diagnostic tool 1 can be specifically developed for use of the method according to the invention.

The diagnostic tool 1 is connected, for example, by a cable to the onboard computer 2, which in turn is connected to an onboard receiver 3.

An emitting tool 4 makes it possible to emit specific excitations.

At least one wheel 5 of the vehicle bears a valve 6 of the type mentioned.

Excited by a specific excitation emitted by the emitting tool 4 actuated by an operator 7, the valve 6 emits in response to that excitation a specific radio field that the onboard receiver 3 receives. The onboard receiver 3 transmits that field to the onboard computer 2 which decodes it.

The diagnostic tool 1 retrieves from the onboard computer 2 at least the "valve identifier" and "state" data contained in the field.

The field of the valve 6 excited by means of the emitting tool 4 contains a specific state different from that contained in the fields emitted by other valves not excited by the emitting tool 4. That specific state makes it possible to distinguish the specific field.

The diagnostic tool 1 analyzes the fields it receives. It recognizes the identifier of the valve 6 excited by means of the emitting tool 4, for it is contained in a field containing a specific state.

The diagnostic tool 1 then distinctively presents the identifier of that valve 6 to the operator 7. Means of distinction can be, for example, a display in a specific screen area or according to a particular format.

In another embodiment of the invention, the diagnostic tool 1 displays all the pairs ("valve identifier", "state") it receives. The operator 7 analyzes them and recognizes the identifier of the valve 6 excited by means of the emitting tool 4. The means of distinction of the identifier of the valve 6 is then the display of the specific state opposite that identifier.

The diagnostic tool 1 knows the identifiers of the wheels 5 of the vehicles capable of bearing emitting valves 6 of the type mentioned from its parametering or, according to another embodiment of the invention, because it received this information from the onboard computer 2.

The wheel identifiers can be, for example, "1" for the left front wheel, "2" for the right front wheel, "3" for the right rear wheel and "4" for the left rear wheel.

A wheel can also be identified by one or more predefined memory addresses, where the information relating to that wheel is written. The matching of a valve identifier with a wheel identifier then consists in writing the valve identifier in an address matching that wheel.

The diagnostic tool 1 presents to the operator 7 the different identifiers of the wheels 5 capable of bearing the valve 6 excited by means of the emitting tool 4 or preferably the interpretation of those identifiers in terms of position, for example, "left front wheel" preferably at "1".

By means of the diagnostic tool 1, the operator 7 matches the identifier of the valve 6 that he recognized as having been excited by means of the emitting tool 4 with the identifier of the wheel 5 that he excited by means of the emitting tool 4.

The diagnostic tool 1 then transmits to the onboard computer 2 the "valve identifier" and "wheel identifier" match, in order to update the matching table of those identifiers.

Figure 2:
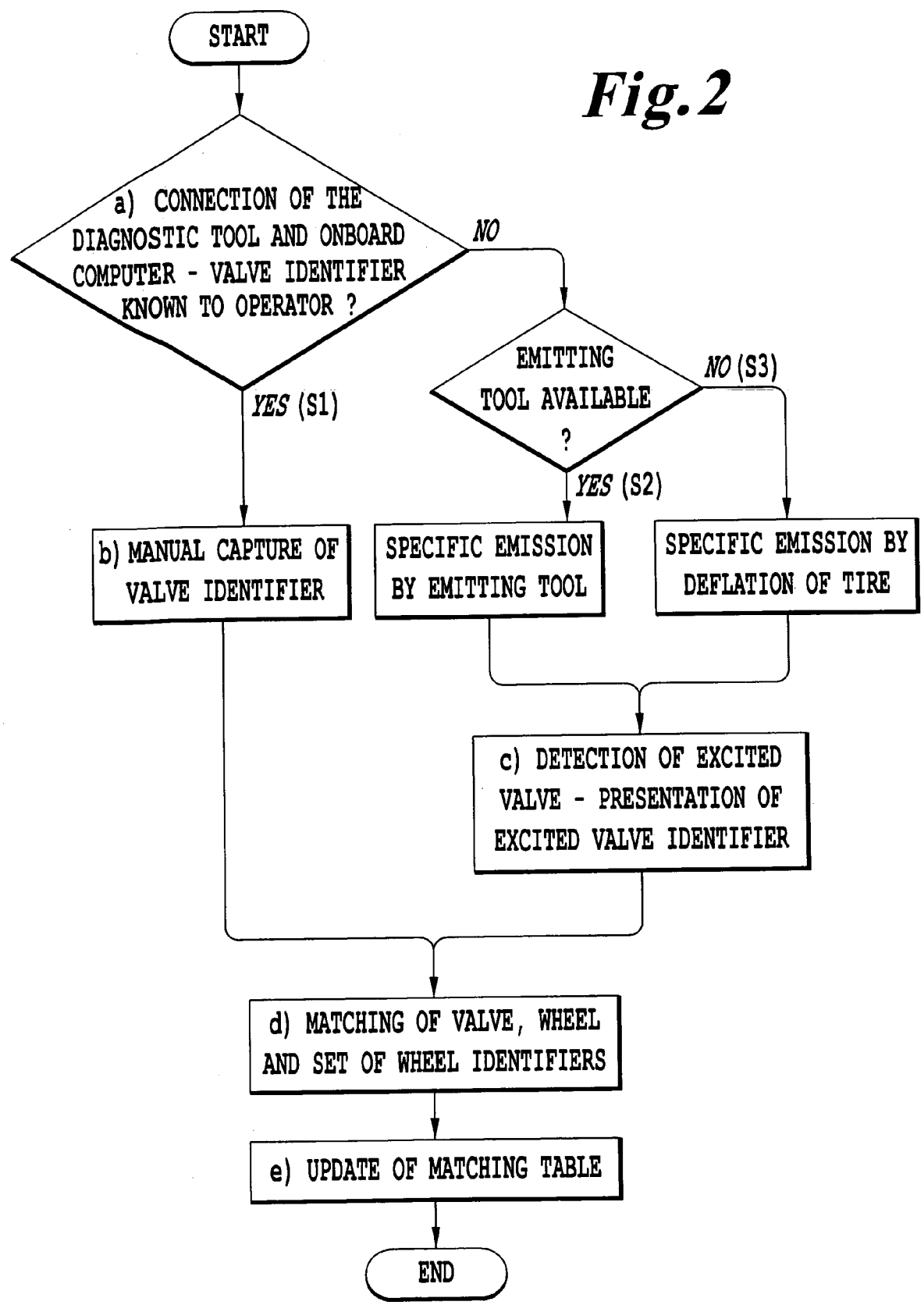
FIG. 2 represents a flowchart of the method of matching a valve identifier and a wheel identifier according to the invention.

According to FIG. 2, the operator 7 proceeds in several stages.

For the operator 7 to be able to apply the method according to this invention, a diagnostic tool 1 must be programmed. The nature of that programming results from use of the diagnostic tool 1, as described below.

In a first stage (a) the operator 7 plugs the diagnostic tool 1 duly programmed into the onboard computer 2 and establishes a connection between them. That connection enables the diagnostic tool 1 to retrieve different information from the computer, notably the content of the fields emitted by valves of the type mentioned and received by the onboard computer 2, and to transmit information to the onboard computer 2 after the operator 7 has made certain decisions, notably, for example, matching of the valve identifiers and wheel identifiers.

Three situations present themselves to the operator 7:

In a first situation (S1), he knows the identifier of the valve 6, for example, because the supplier of the wheel 5 provided it to him;

In a second situation (S2), the most common among garage mechanics, he does not know the identifier of the valve 6 and has an emitting tool 4 to specifically excite that valve 6;

In a third situation (S3), he does not know the identifier of the valve 6 and does not have any emitting tool 4 to specifically excite that valve 6, but he can deflate the tire, so that the valve 6 will generate a field a containing a specific state signifying that emission of the field results from detection of a leak.

The operator 7 enters the situation in which he finds himself in the diagnostic tool 1.

In the first situation (S1), the matching table is updated by a capture of the valve identifier by means of the diagnostic tool 1 (stage "b").

Capture of the identifier of the valve 6 is indispensable. Computer routines can make it possible to control the validity of the inputs. Other means of capture such as, for example, bar code capture, can also be proposed.

In the second and third situations (S2 and S3), the operator 7 does not know the identifier of a valve 6 of a wheel 5, upon a wheel change, for example.

He must therefore excite the valve 6 whose identifier he does not know with a specific signal. In response to that specific excitation signal, the valve 6 emits a field containing a specific state, which makes it possible for that field to be distinguished from the other fields sent by other valves emitting on the same frequency, for example, valves of the other wheels of the vehicle.

Depending on the type of emission, a state can, for example, take values "01", "02", "03" or "00", signifying respectively a normal emission on stopping of the vehicle, a normal emission on running, an emission due to a specific excitation after a leak, or produced by a specific excitation generated by a wave emitted by an emitting tool 4. The last two excitations are called specific, because they are normally exceptional and are therefore distinguished from the other types of excitations more commonly generated.

Upon reception of the information specifying that the operator 7 finds himself in the second or third situation, the diagnostic tool 1 initializes a reference value at the value of the state corresponding to an emission following an excitation by an emitting tool 4, "00" for example, or following a leak of the tire bearing the valve 6, "03" for example.

If he has an emitting tool 4 enabling him to excite the valve 6 of a wheel 5, the operator 7 excites the valve 6 of that wheel 5 by actuating that emitting tool 4 so that only the valve 6 of that wheel 5 is excited by the specific excitation signal, for example, by emitting that signal in immediate proximity to the valve 6 of the wheel 5.

If he does not have an emitting tool 4 enabling him to excite the valve 6 of such a wheel 5, the operator 7 can excite the valve 6 of that wheel 5 by making it leak.

In response to the specific excitation signal, the valve 6 emits at least one field containing a specific state corresponding to the type of excitation received, for example, "00" or "03", depending on whether the emission results from an excitation by an emitting tool 4 or follows a leak, respectively.

The fields coming from the emitting valves are received by the onboard receiver 3, which transmits them to the onboard computer 2.

The diagnostic tool 1 then more or less continuously scans the part of the memory of the onboard computer 2 where those fields are registered. It analyzes the states contained in those fields and compares them to the reference value.

When a valve 6 is specifically excited with the emitting tool 4 or following a rapid leak, it emits a field containing a state equal to the reference value.

Following stage "c", the diagnostic tool 1 detects that equality, retrieves, notably, the valve identifier of the field containing that state and proposes to the operator 7 matching that valve identifier with a position of wheel 5.

In stage "d" the operator 7 matches the identifier of the valve 6 with an identifier of the wheel 5 bearing said valve 6 by entering or marking those identifiers in the diagnostic tool 1 by means of captures or selections.

The dialogue between the diagnostic tool 1 and the operator 7 can take place through standard computer tools, such as screen, keyboard, mouse or bar code reader.

Selections on a screen 8 by means of dialogue boxes, patterns, pull-down menus, icons, etc. can supplement the keyboarding, a source of errors.

The dialogue means are not exclusive from one another.

A value of a set of wheels identifier also can be matched with a valve identifier and a wheel identifier.

Some vehicles are, in fact, equipped with two sets of wheels, a first one for winter and a second one for summer. The onboard computer 2 can be designed to memorize the two sets of wheels.

The diagnostic tool 1 makes possible a matching in the same stage "d" of the identifier of the set of one wheel 5, of the identifier of that wheel 5 and of the identifier of the valve 6 it bears, the set capture or selection being carried out by standard means of dialogue between an operator 7 and a computer.

After having initially matched in the memory of the onboard computer 2, for each of the wheels of the two sets, the identifier of the wheel 5, the identifier of the set to which it belongs and the identifier of the valve 6 it bears, the operator 7 can change the set of wheels without having to specify the valve identifiers again to the onboard computer 2. It is sufficient for him to respect the positions that the wheels of the new set had on the initial matching.

The on-board computer 2 recognizes whether the valve identifiers belong to the first or second set of wheels and deduces from the matching table the identifier of the wheels bearing them.

In the following stage "e", the diagnostic tool 1 transmits to the onboard computer 2 the triplets, arranged in a function order of the onboard computer 2 ("set identifier", "wheel identifier", "valve identifier") and modifies or has the onboard computer 2 modify the matching table of the onboard computer 2 accordingly.

The diagnostic tool 1 can then ask the user whether he wishes to update the match of another wheel 5 or to stop.

One option of the diagnostic tool 1 enables the operator 7 to specify, from the first stage "a", the number of wheels 5 whose match he wishes to update, in which case the program keeps looping until all those updates have been completed.

Ordinarily a parametering of the program of the diagnostic tool 1 enables the operator 7 to exit the program as soon as he wants, regardless of the stage of the procedure.

In order to avoid leaving the diagnostic tool 1 scanning memory of the onboard computer 2, a timing can be started on the first stage "a". If on completion of that timing no field containing a state equal to the reference value has been received by the onboard receiver 3 and transmitted to the onboard computer 2, the diagnostic tool 1 informs the operator 7, through an error message on the screen 8 or through a sound signal, for example, of the failure of the matching procedure. The diagnostic tool 1 can, for example, display a menu enabling the operator 7 to choose to resume the procedure from the first stage "a" or to end it.

The response of a valve 6 following a leak in the tire of the wheel 5 bearing it can take several minutes. For example, a period of 15 minutes may be necessary between the start of deflation and that emission. That is why it is preferable to use an emitting tool 4 rather than to deflate the tire of the wheel 5. The loss is all the greater as it is necessary to reinflate the tire after having identified the valve 6.

This period before emission justifies a relatively long timing in case of excitation of a valve 6 by deflation, for example 60 minutes compared, for instance, to 10 minutes, in case of excitation by means of an emitting tool 4.

As is now clearly evident, the method according to the invention provides a means of matching in an onboard computer 2 the identifier of a valve 6 of a wheel 5 with the identifier of that wheel 5, which is inexpensive and compatible with valves 6 of the above-mentioned type emitting on various frequencies.

This invention is, of course, not limited to the embodiment described and represented, supplied by way of illustration and without limitation.

What is claimed is:

1. Method of matching an identifier of an emitting valve of a wheel with an identifier of the wheel registered in a memory of an onboard computer of a motor vehicle, the emitting valve configured to emit, in response to a specific excitation, a specific field of radio signals containing at least one valve identifier and one specific state, an onboard receiver receiving the specific field and transmitting the specific field to the onboard computer, and the onboard computer decoding the specific field, the method comprising:

specific excitation of the emitting valve;
receiving the specific field emitted in response to the specific excitation;
decoding the specific field;
analyzing the at least one valve identifier and one specific state data contained in the specific field and recognizing the identifier of the emitting valve;
presenting to an operator at least the valve identifier data contained in the specific field, and rendering the data distinguishable;
matching the identifier of the wheel with the identifier of the emitting valve by the operator; and
inputting in the memory the identifier of the emitting valve matching the identifier of the wheel;
wherein said presenting is made by a diagnostic tool, the diagnostic tool receiving the at least one valve identifier and one specific state data by the onboard receiver.

2. Method according to claim 1, wherein the at least one valve identifier and one specific state data received by the diagnostic tool are previously decoded by the onboard computer.

3. Method according to claim 1, wherein the specific excitation is produced by an emitting tool.

4. Method according to claim 1, wherein the specific excitation is produced by a deflation of a tire of a wheel bearing the emitting valve.

5. Method according to claim 1, wherein the diagnostic tool carries out analysis of the at least one valve identifier and one specific state data contained in the specific field and recognition of the identifier of the emitting valve.

6. Method according to claim 1, wherein the operator carries out the matching by the diagnostic tool.

7. Method according to claim 1, wherein the inputting in the memory of the valve identifier is matched with the wheel identifier by the diagnostic tool.

8. Method according to claim 7, wherein the diagnostic tool transmits to the onboard computer a valve identifier that it has received from the onboard computer.

9. Method according to claim 1, wherein a set of wheels identifier is entered in the memory matching the wheel identifier and the emitting valve identifier.

10. System of matching an identifier of an emitting valve of a wheel with an identifier of the wheel registered in a memory of an onboard computer of a motor vehicle, the emitting valve configured to emit, in response to a specific excitation, a specific field of radio signals containing at least one valve identifier and one specific state, an onboard receiver receiving the specific field and transmitting the specific field to the onboard computer, and the onboard computer decoding the specific field, the system comprising:

a diagnostic tool configured to receive the at least one valve identifier and the one specific state by the onboard receiver and to present the at least one valve identifier and one specific state to an operator.

* * * * *